US009749885B2

(12) United States Patent
Rajakarunanayake et al.

(10) Patent No.: US 9,749,885 B2
(45) Date of Patent: Aug. 29, 2017

(54) LOCATION DETERMINATION USING PILOTS SIGNALS IN A WIRELESS LOCAL AREA NETWORK (WLAN)

(71) Applicant: Avago Technologies General IP (Singapore) Pte. Ltd., Singapore (SG)

(72) Inventors: Yasantha Rajakarunanayake, San Ramon, CA (US); Vinko Erceg, Cardiff, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/291,866

(22) Filed: May 30, 2014

(65) Prior Publication Data
US 2014/0355466 A1 Dec. 4, 2014

Related U.S. Application Data

(60) Provisional application No. 61/829,529, filed on May 31, 2013, provisional application No. 61/953,127, filed on Mar. 14, 2014.

(51) Int. Cl.
*H04W 24/08* (2009.01)
*H04W 24/00* (2009.01)
*H04W 4/18* (2009.01)

(52) U.S. Cl.
CPC ........... *H04W 24/08* (2013.01); *H04W 4/185* (2013.01); *H04W 24/00* (2013.01)

(58) Field of Classification Search
CPC ....... H04W 4/02; H04W 4/025; H04W 24/00; H04W 24/08
See application file for complete search history.

(56) References Cited

U.S. PATENT DOCUMENTS

| 2002/0186708 A1* | 12/2002 | Chen ...................... H04B 1/707 370/465 |
| 2012/0120940 A1* | 5/2012 | Pi .......................... H04W 36/16 370/342 |
| 2013/0143595 A1* | 6/2013 | Moshfeghi ............ G01S 5/0236 455/456.1 |
| 2014/0112166 A1 | 4/2014 | Schwengler |

(Continued)

*Primary Examiner* — Benjamin H Elliott, IV
(74) *Attorney, Agent, or Firm* — Sterne, Kessler, Goldstein & Fox P.L.L.C.

(57) ABSTRACT

A communication network of the present disclosure can determine one or more locations of communication devices within its geographic coverage area based upon one or more communication signals that are communicated within the communication network and/or between the communication network and another communication network. The one or more communication devices within the communication network can be implemented to utilize, for example, pilot signals encoded using orthogonal frequency-division multiplexing (OFDM) on multiple carrier frequencies to concurrently transmit the one or more communication signals over multiple signal pathways. The communication devices can determine one or more characteristics of these various communication signals that are received over the multiple signal pathways to assist in determining the one or more locations. Thereafter, the communication devices can determine one or more properties from the one or more characteristics to determine the one or more locations.

20 Claims, 3 Drawing Sheets

(56) References Cited

U.S. PATENT DOCUMENTS

| | | | |
|---|---|---|---|
| 2014/0269357 A1* | 9/2014 | Dhakal | H04L 5/0048 |
| | | | 370/252 |
| 2014/0327579 A1* | 11/2014 | Hart | G01S 3/48 |
| | | | 342/374 |
| 2014/0355466 A1* | 12/2014 | Rajakarunanayake | H04W 24/00 |
| | | | 370/252 |
| 2015/0323642 A1* | 11/2015 | Mutz | G01S 3/74 |
| | | | 342/417 |

* cited by examiner

LOCATION DETERMINATION USING PILOTS SIGNALS IN A WIRELESS LOCAL AREA NETWORK (WLAN)

CROSS-REFERENCE TO RELATED APPLICATIONS

This application claims the benefit of provisional application No. 61/829,529, filed on May 31, 2013, and provisional application No. 61/953,127, tiled on Mar. 14, 2014, each of which is incorporated herein by reference in its entirety.

BACKGROUND

Field of Disclosure

The present disclosure relates generally to locating a wireless communication device within a wireless network.

Related Art

A cellular network is a wireless network distributed over a geographic area that is divided into cells. Each cell is served by at least one fixed-location transceiver, known as a base station. The base station is responsible for handling traffic and signaling between communication devices and a network switching subsystem. When joined together, the cells provide communications over a wide geographic area. This enables a mobile communication device to communicate with another mobile communication device, with a base station, and/or with another communication device within the cellular network.

The mobile communication device represents a device that can initiate and receive communications over a radio link in accordance with one or more communication standards or protocols while moving around a wide geographic area. The one or more communication standards or protocols can include, for example, various cellular communication standards such as a third Generation Partnership Project (3GPP) Long Term Evolution (LTE) communications standard, a fourth generation (4G) mobile communications standard, a third generation (3G) mobile communications standard, and/or various networking protocols such an Institute of Electrical and Electronics Engineers (IEEE) 802.11 communications standard or any other Wi-Fi wireless network communications standard or protocol. For example, in LTE, the mobile communication device over the cellular network by sending and receiving various orthogonal frequency-division multiplexed (OFDM) communication signals. OFDM represents a method of encoding communication signals on multiple carrier frequencies. By using OFDM, a large number of closely spaced orthogonal sub-carrier signals can be used to communicate data on several parallel data streams or channels. This minimizes the cross-talk between the data streams or channels allowing for multiple concurrent transmissions.

Often times, knowing a physical location, or simply a location, of the mobile communication device within the cellular network can be beneficial to a user of the mobile communication device, as well as an operator of the cellular network. This allows the mobile communication device and/or the cellular network to provide location-based services (LBS) to the user. LBS represent various services that are provided to the users that depend upon the physical location of the mobile communication device. These services can include, for example, recommending social events in a city, requesting the nearest business or service such as an automated teller machine (ATM) or restaurant, turn by turn navigation to an address, locating people on a map, location-based mobile advertising, or contextualizing learning and research as well as many other services.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears.

The present disclosure will now be described with reference to the accompanying drawings. In the drawings, like reference numbers generally indicate identical, functionally similar, and/or structurally similar elements.

DETAILED DESCRIPTION OF THE DISCLOSURE

Overview

A communication network of the present disclosure can determine one or more locations of one or more communication devices, such as one or more mobile communication devices, one or more wireless access points, and/or one or more base stations to provide some examples, within its geographic coverage area based upon one or more communication signals that are communicated within the communication network and/or between the communication network and another communication network. The one or more communication signals can include, or can be used, to establish one or more communication links between the one or more communication devices. The one or more communication devices can determine one or more characteristics of the one or more communication signals that are received over the multiple signal pathways to assist in determining the one or more locations. The one or more characteristics can represent a physical attribute of the one or more communication signals that can be measured, for example, one or more amplitudes, one or more phases, and/or one or more frequencies, as received over the multiple signal pathways.

Thereafter, the one or more communication devices can determine one or more properties of the one or more communication signals. The one or more properties of the one or more communication signals can represent other attributes of the one or more communication signals that can be calculated using the one or more characteristics, such as Angle of Arrival (AoA) to provide an example. These properties can be used to determine the one or more locations of the one or more communication devices. The communication network can provide location-based services (LBS), or other services, to the one or more communication devices once the one or more locations are determined.

Mixed Communication Environment According to an Exemplary Embodiment

Figure 1:
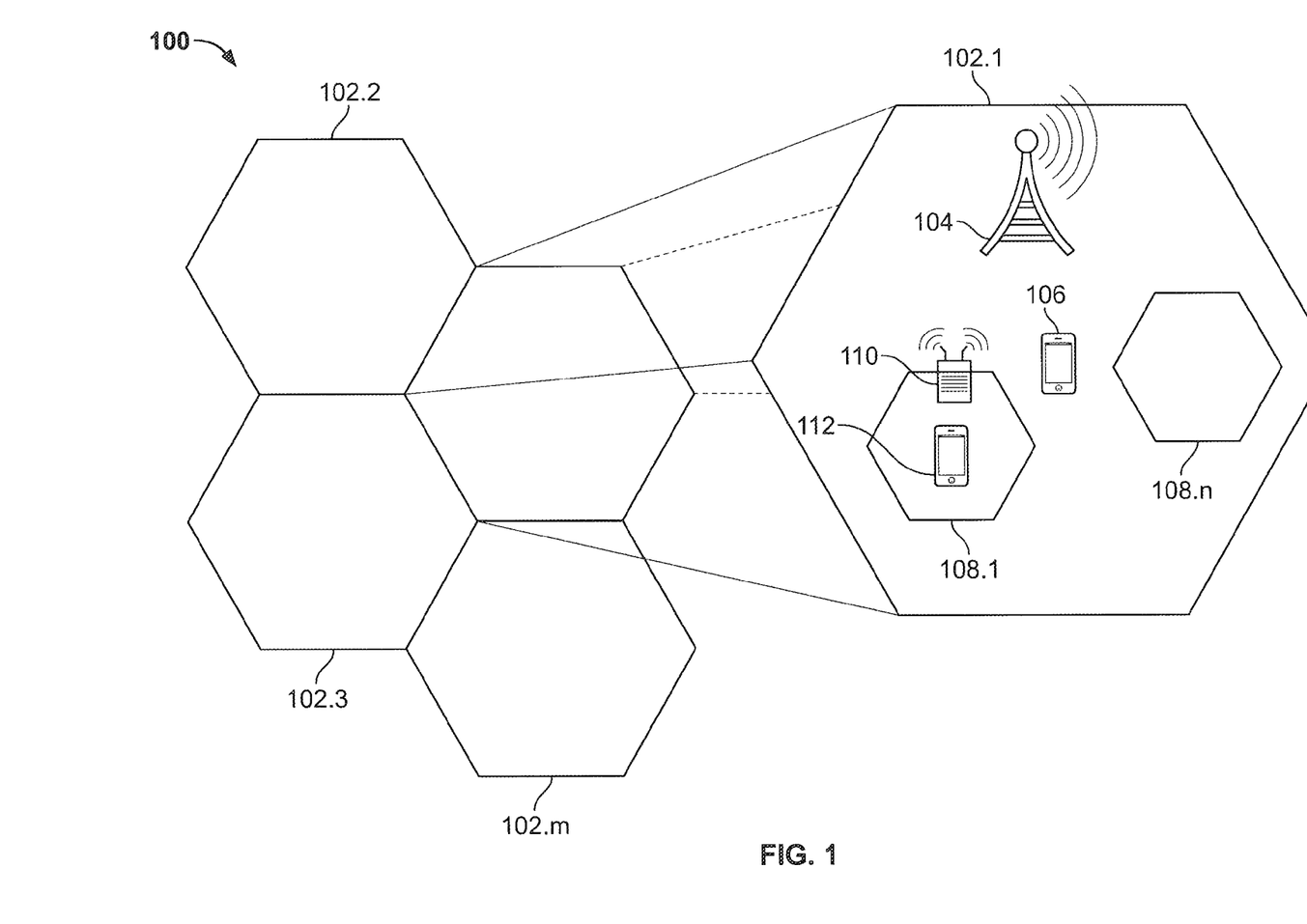
FIG. 1 illustrates a wireless communication environment according to an exemplary embodiment of the present disclosure.

FIG. 1 illustrates a mixed communication network environment according to an exemplary embodiment of the present disclosure. A mixed communication network environment 100 provides wireless communication capabilities to mobile communication devices within its geographic coverage area that is distributed over cells 102.1 through 102.*m*. The cells 102.1 through 102.*m* can include one or more base stations to provide cellular communication capabilities to the mobile communication devices, one or more wireless access points to provide wireless networking capabilities to the mobile communication devices, or any combination of the one or more base stations and the one or more wireless access points. The one or more base stations and/or the one or more wireless access points can determine one or more locations of the mobile communication devices within their corresponding cells 102.1 through 102.*m*. Once the one or more locations are determined, the one or more base stations and/or the one or more wireless access points can provide location-based services (LBS), or other services, to their corresponding mobile communication devices. It should be noted that the number of cells, base stations, wireless access points, and/or mobile communication devices within the mixed communication network 100 is for illustrative purposes only. Those skilled in the relevant art(s) will recognize that a different number of cells, base stations, wireless access points, and/or mobile communication devices are possible without departing from the spirit and scope of the present disclosure. In the discussion to follow, operation of the cell 102.1 is to be described in further detail below. Those skilled in the relevant art(s) will recognize that the cells 102.2 through 102.*m* can operate in a substantially similar manner as the cell 102.1 without departing from the spirit and scope of the present disclosure.

As illustrated in FIG. 1, the cell 102.1 can include a base station 104 to provide the cellular communication capabilities to at least one mobile communication device 106. The base station 104 can communicate with the mobile communication device 106 in accordance with one or more cellular communication standards or protocols. The one or more cellular communication standards or protocols can include various cellular communication standards such as a third Generation Partnership Project (3GPP) Long Term Evolution (LTE) communication standard, a fourth generation (4G) mobile communication standard, a third generation (3G) mobile communication standard to provide some examples.

As additionally, illustrated in FIG. 1, the cell 102.1 can include one or more wireless local area networks (WLANs) 108.1 through 108.*n* to provide the wireless networking capabilities to at least one mobile communication device 112. It should be noted that the number of WLANs within the cell 102.1 is for illustrative purposes only. Those skilled in the relevant art(s) will recognize that a different number of WLANs are possible without departing from the spirit and scope of the present disclosure. In the discussion to follow, operation of the WLAN 108.1 is to be described in further detail below. Those skilled in the relevant art(s) will recognize that the WLANs 108.2 through 108.*n* can operate in a substantially similar manner as the WLAN 108.1 without departing from the spirit and scope of the present disclosure. The WLAN 108.1 can include a wireless access point 110 which provides the wireless networking capabilities to the mobile communication device 112 within its geographic coverage area. The wireless access point 110 can communicate with the mobile communication device 112 in accordance with one or more wireless networking standards or protocols. The one or more wireless networking standards or protocols can include an Institute of Electrical and Electronics Engineers (IEEE) 802.11 communication standard or any other Wi-Fi wireless network communication standard or protocol to provide some examples. In an exemplary embodiment, the wireless access point 110 is located within a coverage area of the base station 104 that is characterized as being poor, for example, within a residential building, an office building, or a commercial building to provide some examples. In another exemplary embodiment, more than one wireless access point 110 can be located within the residential building, the office building, or the commercial building.

The mixed communication network environment 100 can determine one or more locations of the base station 104, the mobile communication device 106, the wireless access point 110, and/or the mobile communication device 112 within one or more of the cells 102.1 through 102.*m* based upon one or more communication signals that are communicated within the mixed communication network environment 100 and/or between the communication network and another mixed communication network environment 100. Although the description to follow describes determining a location of the mobile communication device 112 within the mixed communication network environment 100, those skilled in the relevant art(s) will recognize that the respective locations of the base station 104, the mobile communication device 106, and/or the wireless access point 110 can be determined in a substantially similar manner without departing from the spirit and scope of the present disclosure.

The mobile communication device 112 can receive one or more communication signals from one or more of the base station 104, the mobile communication device 106, and/or the wireless access point 110. The one or more communication signals can be formatted in accordance with the corresponding ones of the one or more cellular communication standards and/or the one or more wireless networking standards. In an exemplary embodiment, the one or more cellular communication standards and/or the one or more wireless networking standards outline certain communication signals, referred to as pilot signals, that can be used for supervisory, control, equalization, continuity, synchronization, and/or reference purposes to provide some examples. For example, some of sub-carriers in OFDM symbols may carry pilot signals for measurement of channel conditions, time synchronization, and/or frequency synchronization. In LTE, pilot signals, also referred to as reference signals in LTE, are usually placed onto the first, fourth, seventh, and tenth sub-carriers in a resource block, whereby a first and a second reference signal is placed onto the first and the seventh sub-carriers, respectively, and a third and a fourth reference signal is placed onto the fourth and the tenth sub-carriers, respectively. The utilization of the one or more pilot signals allows the mobile communication device 112 to determine its location within the mixed communication network environment 100 using existing communication signals that are already present within the mixed communication network environment 100 and/or used by the mixed communication network environment 100 for communication. This advantageously prevents the mixed communication network environment 100 from having to introduce specialized communication signals, or to supplement existing communication signals with various fields, to determine the location of the mobile communication device 112.

The mobile communication device 112 can receive the one or more pilot signals from the base station 104 and/or the wireless access point 110. In an exemplary embodiment, the mobile communication device 112 can be implemented to utilize, for example, an implicit beamforming technique to receive the one or more pilot signals. The implicit beamforming technique allows the one or more pilot signals to receive the one or more pilot signals over multiple signal pathways within the mixed communication network 100. The mobile communication device 112 can determine one or more characteristics, such as one or more amplitudes and/or one or more phases to provide some examples, of the one or more pilot signals that are received over the multiple signal pathways. For example, the mobile communication device 112 can determine a first phase and/or a first amplitude of a corresponding pilot signal from among the one or more pilot signals as received by a first signal pathway and a second phase and/or a second amplitude of the corresponding pilot signal as received by a second signal pathway. In an exemplary embodiment, the one or more pilot signals can represent multiple synchronized sinusoidal signals, referred to as tones, within different pre-determined frequency bands, for example 2.4 GHz and 5 GHz. In this exemplary embodiment, the base station 104 and/or the wireless access point 110 can adjust a frequency of these multiple synchronized sinusoidal signals be in a continuous or stepwise manner to allow for multiple phase difference measurements to improve accuracy of the one or more properties.

Thereafter, the mobile communication device 112 can determine one or more properties, such as Angle of Arrival (AOA) or Angle of Departure (AOD) to provide some examples, of the pilot signals based upon the one or more characteristics to determine its location within the mixed communication network environment 100. The AoA or AoD is typically characterized as being a coarse location estimate of the mobile communication device 112 representing a direction, usually along a three-dimensional line, from the base station 104 and/or the wireless access point 110 to the mobile communication device 112. In an exemplary embodiment, the mobile communication device 112 can include a look-up table that assigns various characteristics to corresponding properties. In this exemplary embodiment, the mobile communication device 112 can access the look-up table to estimate the one or more properties. Once the location of the mobile communication device 112 is determined, the base station or access point 112 can provide location-based services (LBS), or other services, to the mobile communication device 112.

Optionally, the base station 104 and/or the wireless access point 110 can embed information, such as data or one or more commands, onto the one or more pilot signals. This information can include location information corresponding to the base station 104 and/or the wireless access point 110 to provide an example. Typically, this information has a data rate, such as approximately 1 kHz, that is much lower than a data rate and/or a frequency of the one or more pilot signals. This much lower data rate allows the mobile communication device 112 to substantially simultaneously determine its location and to recover the embedded information.

Exemplary Mobile Communication Device Location Estimate

Figure 2:
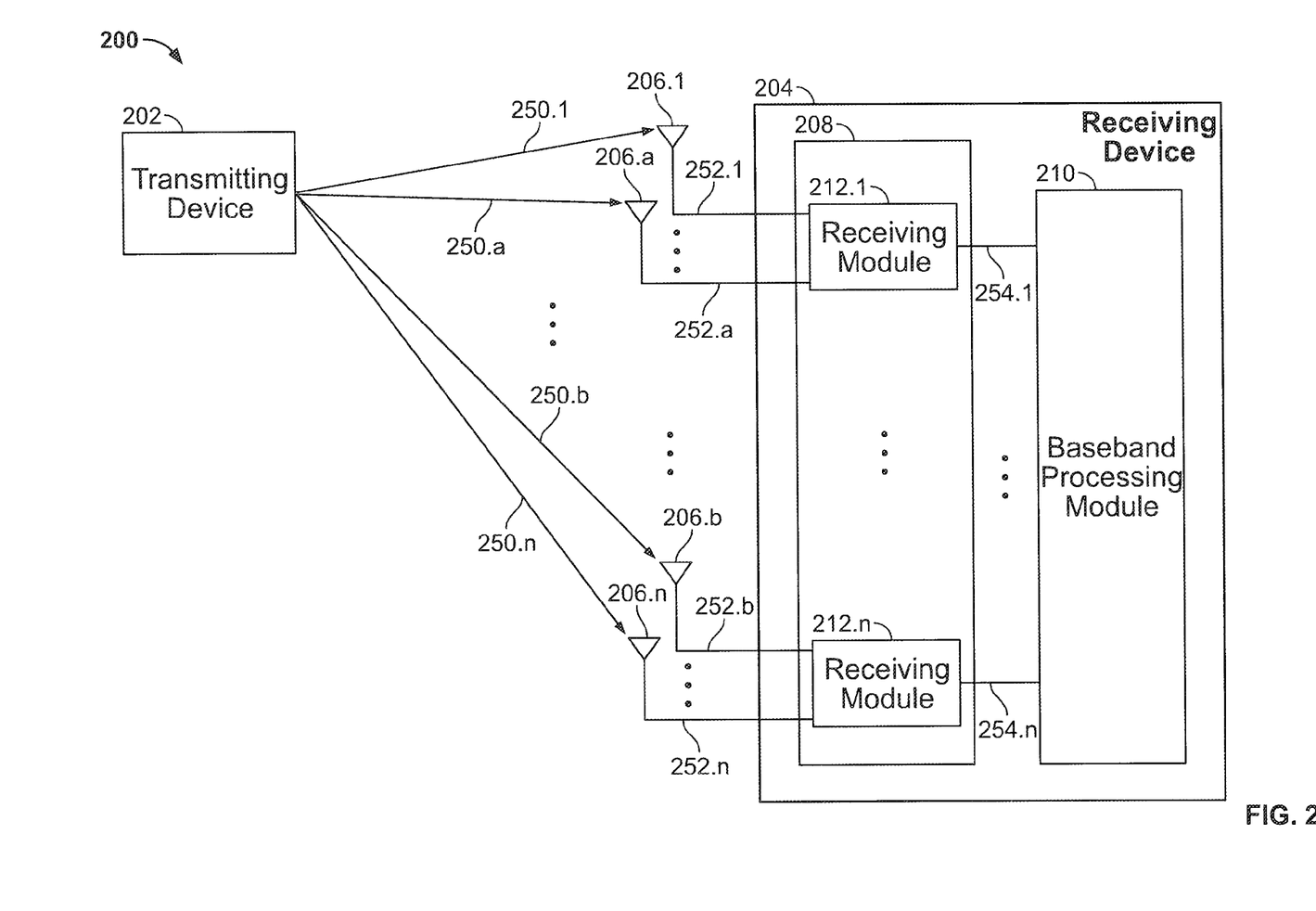
FIG. 2 illustrates a block diagram for a mobile communication device communicating in a communication environment according to an exemplary embodiment.

FIG. 2 illustrates a block diagram for estimating the location of an exemplary transmitting device and an exemplary receiving device that can be implemented within the mixed communication network environment according to an exemplary embodiment. A communication environment 200 provides wireless communication capabilities between a transmitting device 202 and a receiving device 204. The transmitting device 202 can represent an exemplary embodiment of one or more of the base station 104 and/or the wireless access point 110 and the receiving device 204 can represent an exemplary embodiment of the one or more of the mobile communication devices 106 and/or the mobile communication devices 112.

The receiving device 204 observes a communication signal having a pilot signal provided by the transmitting device 202 as the communication signal passes through a communication channel. As illustrated in FIG. 2, the receiving device 204 includes one or more antennas 206.1 through 206.n to observe the pilot signal. In an exemplary embodiment, the one or more antennas 206.1 through 206.n can be separated into one or more groups of antennas. In this exemplary embodiment, a first group of antennas includes antennas 206.1 through 206.a and a second group of antennas includes antennas 206.b through 206.n. However, this exemplary embodiment is not limiting, those skilled in the relevant art(s) will recognize that the one or more groups of antennas can include any suitable number of the one or more antennas 206.1 through 206.n, such as one antenna from among the one or more antennas 206.1 through 206.n to provide an example, without departing from the spirit and scope of present disclosure.

As additionally illustrated in FIG. 2, each of the antennas 206.1 through 206.n observes the pilot signal as it passes through the communication channel along a corresponding signal pathway 250.1 through 250.n to provide observed pilot signals 252.1 through 252.n. For example, a first signal pathway 250.1 represents a first signal pathway that the pilot signal traverses from the transmitting device 202 through the communication channel before being observed by the antenna 206.1. The signal pathways 250.1 through 250.n can have differing propagation characteristics such that the one or more characteristics of the pilot signal can differ along each of the signal pathways 250.1 through 250.n. The difference in the one or more characteristics of the pilot signal along each of the signal pathways 250.1 through 250.n can be used by the receiving device 204 to determine the location of the transmitting device 202.

As additionally illustrated in FIG. 2, the receiving device 204 includes a communication receiving module 208 to process the observed pilot signals 252.1 through 252.n to provide observed pilot sequences 254.1 through 254.n. The communication receiving module 208 includes receiving modules 212.1 through 212.n, each of the receiving modules 212.1 through 212.n processes a corresponding one of the observed pilot signals 252.1 through 252.n to provide a corresponding one of the observed pilot sequences 254.1 through 254.n. In an exemplary embodiment, the receiving modules 212.1 through 212.n process the observed pilot signals 252.1 through 252.n in accordance with the one or more communication standards or protocols. In this exemplary embodiment, the observed pilot sequences 254.1 through 254.n represent digital representations of the observed pilot signals 252.1 through 252.n which have undergone processing in accordance with the one or more communication standards or protocols. This processing can include filtering, gain, noise, and/or phase compensation, equalization, error correction, analog to digital conversion to provide some examples. Additionally, the receiving modules 212.1 through 212.n can determine one or more characteristics, such as amplitude and/or phase to provide some examples, of their corresponding observed pilot sequences 254.1 through 254.n.

As further illustrated in FIG. 2, the receiving device 204 includes a baseband processing module 210 to process the observed pilot sequences 254.1 through 254.n and the one or more characteristics. The baseband processing module 210 can receive the one or more characteristics as part of the observed pilot sequences 254.1 through 254.n, referred to as a soft decision, or can receive the observed pilot sequences 254.1 through 254.n separate from the one or more characteristics, referred to as a hard decision.

The baseband processing module 210 can analyze the observed pilot sequences 254.1 through 254.n and/or the one or more characteristics to determine the one or more properties, such as Angle of Arrival (AoA) and/or Angle of Departure (AoD) to provide some examples, of the observed pilot sequences 254.1 through 254.n based upon the one or more signal characteristics. The baseband processing module 210, for example, may determine a first phase difference and/or a first time difference between the observed communication signal 252.1 received at the first receiving module 212.1 as compared to the observed communication signal 252.2 received at the second receiving module 212.2. Analogously, there may be a second phase difference and/or a second time difference between the observed communication signal 252.2 received at the second receiving module 212.2 and the observed communication signal 252.n received at the receiving module 212.n. Similarly, there may be a $n^{th}$ phase difference and/or a $n^{th}$ time difference between the observed communication signal 252.1 received at the first receiving module 212.1 and the observed communication signal received at the receiving module 212.n.

In an exemplary embodiment, the baseband processing module 210 can calculate a beamforming matrix for the observed pilot sequences 254.1 through 254.n and the one or more properties based upon the beamforming matrix based. For example, the baseband processing module 210 can calculate the beamforming matrix and can determine one or more differences between coefficients within the beamforming matrix based on beamforming calculations and operations upon the beamforming matrix to determine the one or more properties. The beamforming calculations and operations can include, for example, an implicit beamforming technique known in the art, for example, an IEEE 802.11 implicit beamforming technique.

In another exemplary embodiment, the baseband processing module 210 can access a look-up table corresponding to the one or more characteristics to determine the one or more properties. For example, the baseband processing module 210 can access a look-up table corresponding to the measured phases and/or amplitudes of the pilot signal as received over the signal pathways 250.1 through 250.n and can provide the AoA from the look-up table based upon the measured phases and/or amplitudes.

Method for Locating a Mobile Communication Device

Figure 3:
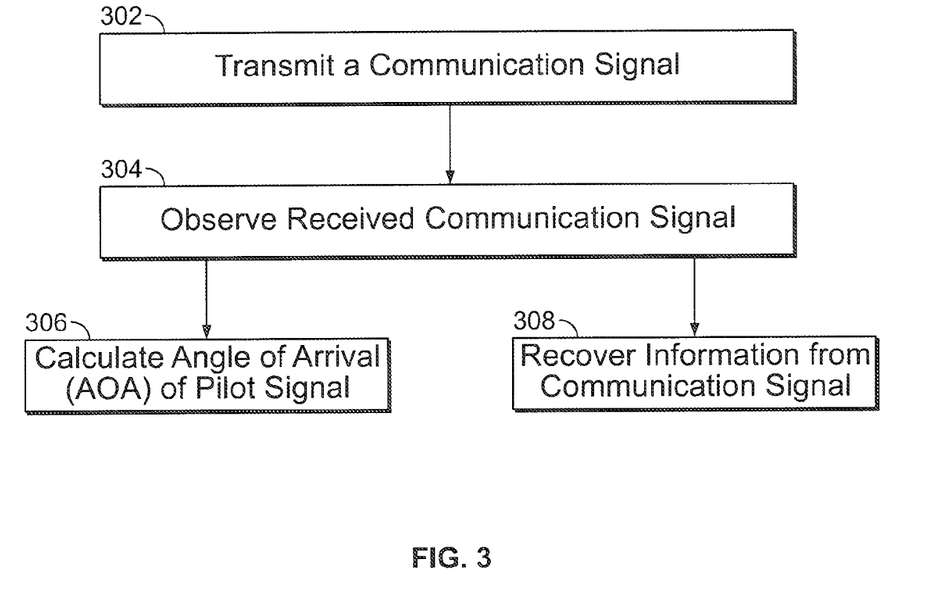
FIG. 3 is a flowchart of exemplary operational steps to determine the location of a mobile communication device according to an exemplary embodiment of the present disclosure.

FIG. 3 is a flowchart of an exemplary control flow according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 3.

At step 302, the operational control flow transmits a communication signal having a pilot signal. The pilot signal can be, or included within, the one or more standard-defined communication signals and/or the one or more non-standard-defined communication signals.

At step 304, the operational control flow observes the communication signal along multiple signal pathways as the communication signal passes through a communication channel. The operational control flow can implement an implicit beamforming technique to observe the communication signal as the communication signal passes through the communication channel.

At step 306, the operational control flow processes the pilot signal from the communication signal to determine one or more properties, such as Angle of Arrival (AoA), of the received communication signal.

At step 308, the operational control flow processes other portions of the communication signal to recover information from the communication signal. The operational control flow can process these other portions of the communication signal substantially simultaneously with processing of the pilot signal in step 306.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limit the disclosure. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware software, routines, instructions, etc.

The Detailed Description of the exemplary embodiments fully revealed the general nature of the disclosure that others can, by applying, knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

References in the disclosure to a "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

What is claimed is:

1. A mobile communication device in a wireless local area network (WLAN), the mobile communication device comprising:
    a plurality of receiver modules configured to:
        determine a plurality of amplitudes, phases, or frequencies of a plurality of received pilot signals, the plurality of received pilot signals representing a pilot signal that is received by the plurality of receiver modules over a plurality of different signal pathways,
        wherein the pilot signal is embedded with information having a data rate less than a data rate of the pilot signal or a frequency of the pilot signal, and
        recover the information embedded in the pilot signal; and
    a processor module configured to:
        calculate a property of the plurality of received pilot signals based upon a comparison of the plurality of amplitudes, phases, or frequencies, and
        determine a location of the mobile communication device within the WLAN based upon the property of the plurality of received pilot signals and the recovered information embedded in the pilot signal.

2. The mobile communication device of claim 1, wherein the property comprises:
    an angle of arrival (AoA) of the pilot signal.

3. The mobile communication device of claim wherein the mobile communication device is configured to operate in accordance with an Institute of Electrical and Electronics Engineers (IEEE) 802.11 communication standard or protocol.

4. The mobile communication device of claim 1, further comprising:
    a plurality of antennas configured to receive the pilot signal over the plurality of different signal pathways.

5. The mobile communication device of claim 1, wherein the plurality of receiver modules is configured to determine the plurality of amplitudes, phases, or frequencies in accordance with an implicit beamforming technique.

6. The mobile communication device of claim 1, wherein the pilot signal is outlined by a wireless networking standard.

7. The mobile communication device of claim 1, wherein the pilot signal is included within a communication signal.

8. The mobile communication device of claim 1, wherein the plurality of receiver modules is further configured to recover the information embedded in the pilot signal substantially simultaneously with determining the plurality of amplitudes, phases, or frequencies.

9. The mobile communication device of claim 1, wherein the information comprises:
    location information corresponding to a communication device that provided the pilot signal.

10. A communication device in an Institute of Electrical and Electronics Engineers (IEEE) 802.11 communication standard or protocol capable wireless network, the communication device comprising:
    a plurality of antennas configured to receive a pilot signal transmitted by a second communication device over a plurality of different signal pathways to provide a plurality of received pilot signals, the pilot signal being embedded with information having a data rate less than a data rate of the pilot signal or a frequency of the pilot signal;
    a plurality of receiver modules configured to:
        determine a plurality of characteristics of the plurality of received pilot signals, and
        recover the information embedded in the pilot signal; and
    a processor module configured to:
        calculate a property of the plurality of received pilot signals based upon a comparison of the plurality of characteristics,
        determine a location of the communication device within the IEEE 802.1 communication standard or protocol capable wireless network based upon the property of the plurality of received pilot signals and the recovered information embedded in the pilot signal.

11. The communication device of claim 10, wherein the property comprises:
    an angle of arrival (AoA) of the pilot signal.

12. The communication device of claim 10, wherein the IEEE 802.1 communication standard or protocol capable wireless network comprises:
    a wireless local area network (WLAN).

13. The communication device of claim 10, wherein the plurality of receiver modules is configured to determine the plurality of characteristics in accordance with an implicit beamforming technique.

14. The communication device of claim 10, wherein the pilot signal is outlined by a wireless networking standard.

15. The communication device of claim 10, wherein the pilot signal is included within a communication signal.

16. The communication device of claim 10, wherein the plurality of receiver modules is further configured to recover the information embedded in the pilot signal substantially simultaneously with determining the plurality of characteristics of the plurality of received pilot signals.

17. The communication device of claim 10, wherein the information comprises:
    location information corresponding to the second communication device.

18. A method for locating a communication device within a wireless network, the method comprising:
    receiving, by the communication device, a communication signal having a pilot signal transmitted by a second communication device over a plurality of different signal pathways to provide a plurality of received pilot signals, the pilot signal being embedded with information having a data rate less than a data rate of the pilot signal or a frequency of the pilot signal;
    determining, by the communication device, a plurality of characteristics of the plurality of received pilot signals;
    calculating, by the communication device, a property of the plurality of received pilot signals based upon a comparison of the plurality of characteristics of the plurality of received pilot signals;
    recovering, by the communication device, the information embedded in the pilot signal, and
    determining, by the communication device, a location of the communication device within the wireless network based upon the property of the plurality of received pilot signals and the recovered information embedded in the pilot signal.

19. The method of claim 18, wherein the recovering comprises:
    recovering the information from the pilot signal substantially simultaneously with determining the plurality of characteristics of the plurality of received pilot signals.

20. The method of claim 18, wherein the information comprises:
    location information corresponding to the second communication device.

* * * * *

UNITED STATES PATENT AND TRADEMARK OFFICE
CERTIFICATE OF CORRECTION

PATENT NO. : 9,749,885 B2
APPLICATION NO. : 14/291866
DATED : August 29, 2017
INVENTOR(S) : Rajakarunanayake et al.

It is certified that error appears in the above-identified patent and that said Letters Patent is hereby corrected as shown below:

In Column 9, Line 62, In Claim 3 replace "The mobile communication device of claim wherein" with --The mobile communication device of claim 1 wherein--.

In Column 10, Line 45, In Claim 10 replace "IEEE 802.1" with --IEEE 802.11--.

In Column 10, Line 54, In Claim 10 replace "IEEE 802.1" with --IEEE 802.11--.

Signed and Sealed this
First Day of May, 2018

Andrei Iancu
*Director of the United States Patent and Trademark Office*